7876X
P. HASTINGS.
Plow.
Patented Dec. 19, 1833.
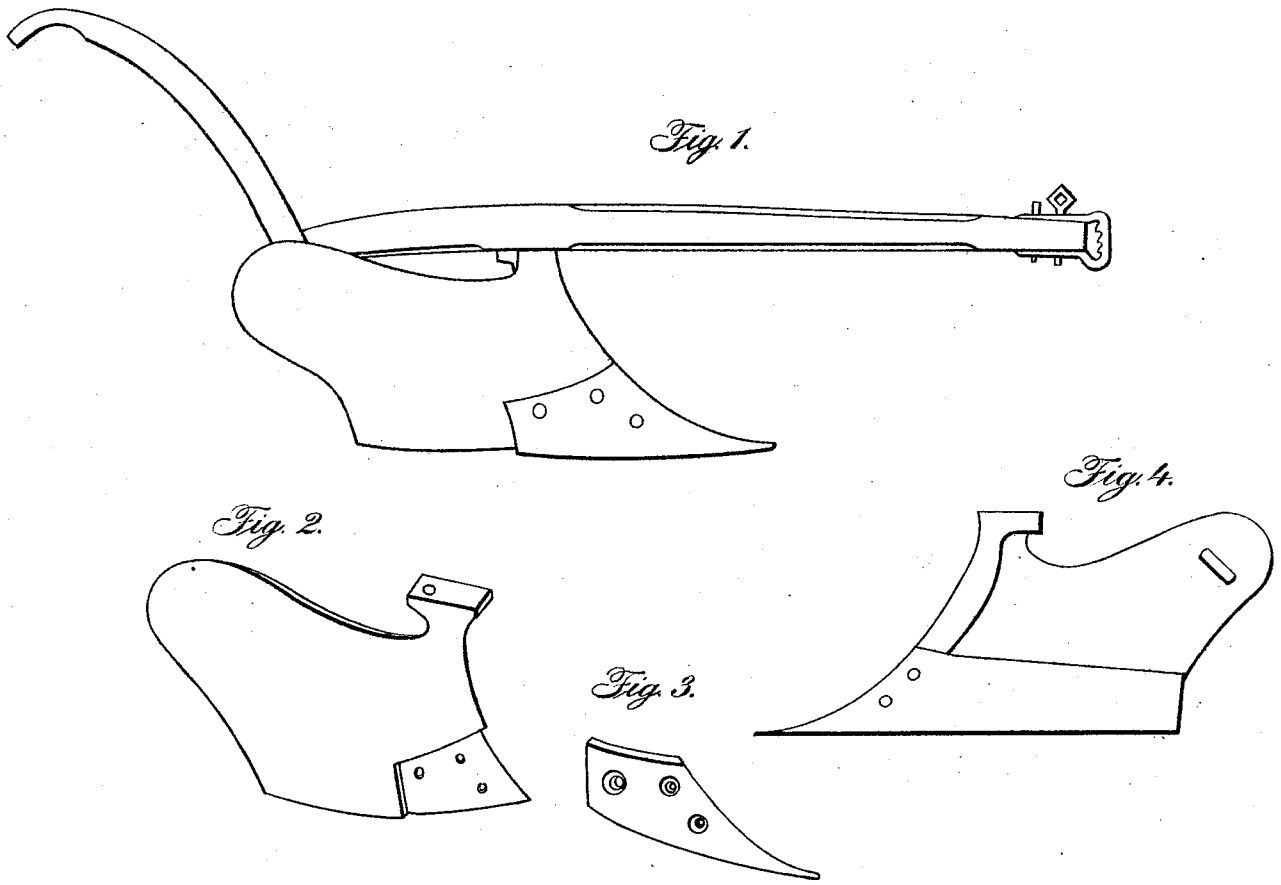
AM. PHOTO-LITHO. CO. N. Y. (OSBORNE'S PROCESS.)

7876X

UNITED STATES PATENT OFFICE.

PETER HASTINGS, OF DAGSBOROUGH, DELAWARE.

IMPROVEMENT IN PLOWS.

Specification forming part of Letters Patent dated December 19, 1833.

*To all whom it may concern:*

Be it known that I, PETER HASTINGS, of Dagsborough, county of Sussex, and State of Delaware, have made an Improvement on Barnard's Patented Plow, which is described as follows:

Mr. Barnard, in the plow which he has patented, makes a movable share of about four inches in height in front, which he attaches to a cast-iron mold-board and landside by bolts and screws, but is not of sufficient height to protect the mold-board in deep, or, indeed, in ordinary plowing.

The improvement which I have made on Mr. Barnard's plow, and which I wish to secure by Letters Patent, consists in casting the movable share and landside sufficiently deep to protect the front of the mold-board from most of the wear to which it is exposed by his plan. To effect this object, a recess is cast in the mold-board sufficiently large and deep to receive my improved share and landside. The share is then attached to the mold-board by bolts and screws placed in proper places for that purpose. The cutting of the sward, &c., is therefore performed wholly by the cutting-edge of the share, and not by any part of the mold-board, whereby a considerable saving of expense for mold-boards is accomplished, because when one share is worn out it can easily be replaced by another at a trifling expense.

PETER HASTINGS.

Witnesses:

WM. P. ELLIOT,

CHAS. M. KELLER.